United States Patent
Bengtsson et al.

(10) Patent No.: US 6,923,102 B1
(45) Date of Patent: Aug. 2, 2005

(54) WASHING DEVICE

(75) Inventors: Jan Bengtsson, Hässleholm (SE); Roland Haraldsson, Bromölla (SE)

(73) Assignee: Potato Processing Machinery AB, Kristianstad (SE)

(*) Notice: Subject to any disclaimer, the term of this patent is extended or adjusted under 35 U.S.C. 154(b) by 501 days.

(21) Appl. No.: 10/018,890

(22) PCT Filed: Jun. 28, 2000

(86) PCT No.: PCT/SE00/01368

§ 371 (c)(1),
(2), (4) Date: Mar. 22, 2002

(87) PCT Pub. No.: WO01/06879

PCT Pub. Date: Feb. 1, 2001

(30) Foreign Application Priority Data

Jun. 29, 1999 (SE) .................... 9902456

(51) Int. Cl.$^7$ ............ B26D 7/08; A23N 15/00; B08B 3/06
(52) U.S. Cl. ............ 83/168; 134/60; 134/104.4; 134/198; 99/536; 99/516
(58) Field of Search ............ 15/3.12, 302, 3.11, 15/3.13, 309.2, 345, 346; 426/506; 137/256, 137/571; 83/168; 99/536, 516, 495, 352, 99/506, 534, 537, 538, 484, 517, 403–409, 99/486; 134/63, 61, 66, 151, 199, 108, 64, 134/15, 21, 60, 104.4, 198, 65, 132

(56) References Cited

U.S. PATENT DOCUMENTS

| | | | | |
|---|---|---|---|---|
| 2,666,711 A | * | 1/1954 | Crosset ............ 426/506 |
| 2,909,872 A | * | 10/1959 | Kearney et al. ............ 134/132 |
| 4,173,493 A | * | 11/1979 | Kallas ............ 75/715 |
| 4,251,895 A | * | 2/1981 | Caridis et al. ............ 15/3.13 |
| 4,472,272 A | * | 9/1984 | Capannoli ............ 209/268 |
| 4,548,211 A | * | 10/1985 | Marks ............ 600/507 |
| 4,549,478 A | | 10/1985 | Entes |
| 4,875,344 A | * | 10/1989 | Zittel ............ 62/381 |
| 5,020,555 A | * | 6/1991 | Nishibayashi ............ 134/65 |
| 5,425,308 A | * | 6/1995 | Dickerson et al. ............ 99/536 |
| 5,517,906 A | * | 5/1996 | Zittel et al. ............ 99/536 |
| 5,669,288 A | * | 9/1997 | Zittel et al. ............ 99/348 |
| 5,752,431 A | * | 5/1998 | Zittel ............ 99/348 |
| 6,047,811 A | * | 4/2000 | Zittel et al. ............ 198/763 |
| 6,207,214 B1 | * | 3/2001 | Kim ............ 426/516 |
| 6,263,785 B1 | * | 7/2001 | Zittel ............ 15/348 |
| 2003/0183092 A1 | * | 10/2003 | Barber et al. ............ 99/516 |

* cited by examiner

Primary Examiner—Allan N. Shoap
Assistant Examiner—Ghassem Alie
(74) Attorney, Agent, or Firm—Burns, Doane, Swecker & Mathis, LLP

(57) ABSTRACT

A washing installation includes a first washer (3) for washing slices of root vegetable with water, a second washer in the form of a rotating pipe (4) supplied with water at an infeed end for the slices of root vegetable washed during slicing, and a third washer (20) with a foraminated conveyor (16) for an additional washing of the slices of root vegetable discharged from the pipe (4) and conveyance of the same to a hopper. On each side of an intermediate portion (7), the rotating pipe (4) has a portion (6, 8) with increased diameter. The intermediate portion (7) is perforated. A water inlet is arranged in the portion (8) with increased diameter after the intermediate portion (7) for replacing the washing water flowing out of the perforations of the intermediate portion (7).

18 Claims, 1 Drawing Sheet

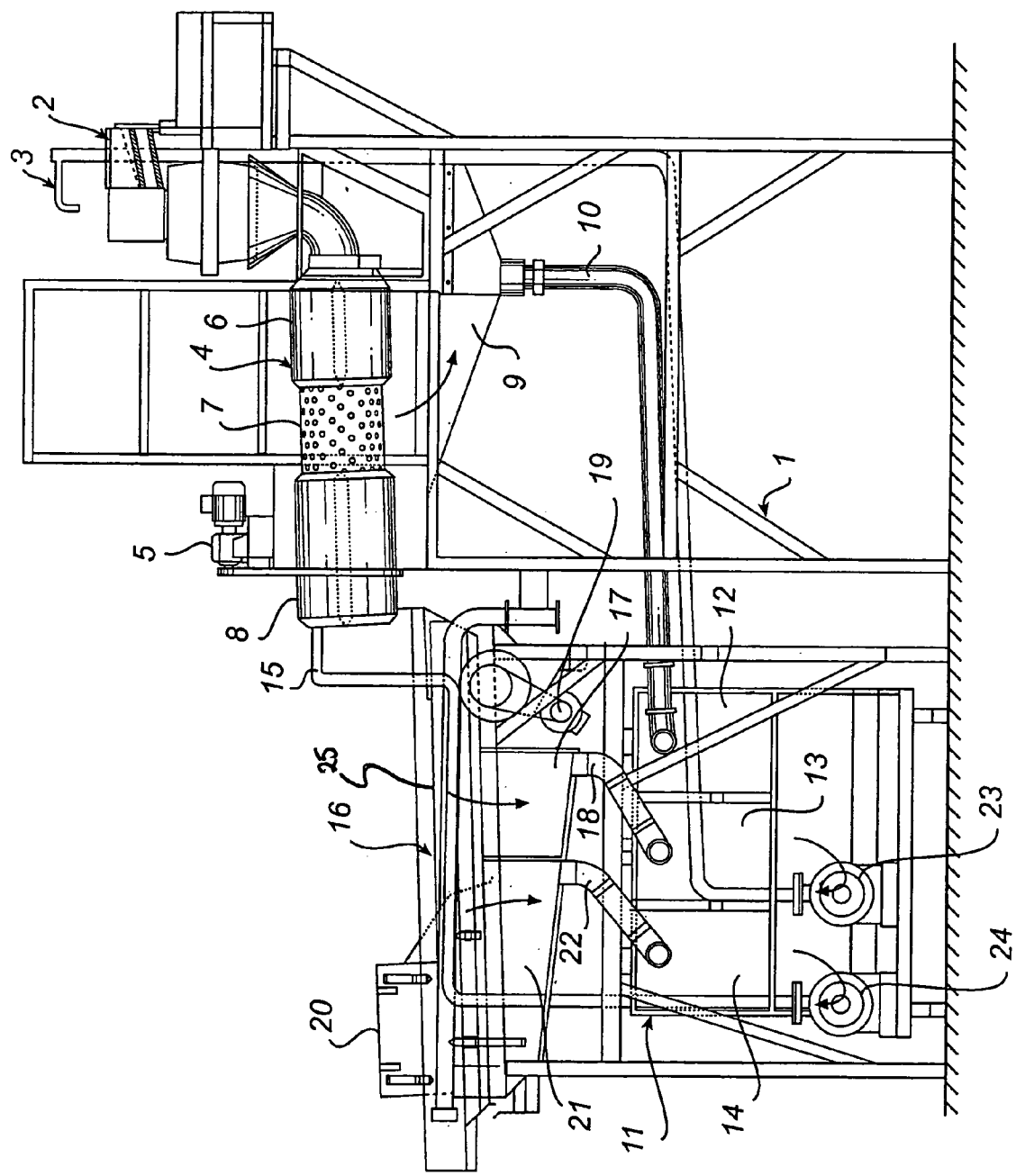

WASHING DEVICE

FIELD OF THE INVENTION

The present invention relates to a washing device or washing installation for slices of root vegetable, especially potatoes.

BACKGROUND OF THE INVENTION

When producing, for instance, potato crisps by deep-frying, it is important that as much as possible of the free starch that forms in slicing is removed before deep-frying. Otherwise the slices tend to stick together, and a layer of starch quickly forms on the walls of the deep fryer, which is used when deep-frying, so that the deep fryer has to be cleaned, which naturally disturbs the production.

A washing installation is known, which comprises a first washer for washing the slices of root vegetable when slicing, a second washer in the form of a rotating pipe with drivers for moving the slices through the pipe, and a third washer with a foraminated conveyor, for instance, a vibrating table.

With an increasing production of crisps, the water consumption has increased to an excessively high level in the prior-art washing installation, in particular if the production in successive deep fryers is to take place continuously during each shift without any interruption for cleaning.

SUMMARY OF THE INVENTION

Therefore, the object of the present invention is to provide a more efficient washing installation involving less water consumption than prior-art devices.

This object is achieved by means of a washing installation. Preferred embodiments are stated in the dependent claims.

A washing installation according to the invention is thus of the kind which comprises a first washer for washing slices of root vegetable with water when slicing the same, a second washer in the form of a rotating pipe supplied with water at an infeed end for the slices of root vegetable washed during slicing, and a third washer with a foraminated conveyor for an additional washing of the slices of root vegetable discharged from the pipe and conveyance of the same to a hopper. According to the invention, such a washing installation is characterised in that the rotating pipe, on each side of an intermediate portion, has a portion with increased diameter, that the intermediate portion is perforated, and that a water inlet is arranged in the portion with increased diameter after the intermediate portion for replacing the washing water flowing out of the perforations of the intermediate portion.

As a result, a considerably increased washing effect is obtained in the pipe, which can be further reinforced by the reflux of washing water counter-currently between the washers which is characteristic of the preferred embodiment of the washing installation according to the invention.

The portions with increased diameter each have a cone-shaped transition at their end facing the intermediate portion and a corresponding transition at their end facing away from the intermediate portion. As a result, each portion with increased diameter forms a basin-like space with efficient washing, in particular if drivers for stirring and moving the slices of root vegetable through the pipe are arranged in each portion with increased diameter.

Advantageously, efficient water use according to the counter-current principle is achieved by means of a first pump for recirculating water from an outlet of the second washer to an inlet of the first washer, and a second pump for recirculating water from an outlet of the third washer to an inlet of the second washer.

The foraminated conveyor of the third washer is advantageously a vibrating table, at one end of which the slices of root vegetable are discharged from the second washer and at the other end of which the third washer is placed.

Advantageously, a collecting tank is arranged having a first section for the first washer, a second section for the second washer and a third section for the third washer.

The inlet of the first pump is then connected to the second section, and the inlet of the second pump is connected to the third section.

To ensure that there is water for the pumping circulation, independently of the supply of fresh water, i.e. to the inlet of the third washer, the first section can be connected to the second section for reflux of water from the first section to the second section at a lower water level in the second section than in the first section, and the second section can be connected to the third section for reflux of water from the second section to the third section at a lower water level in the third section than in the second section.

BRIEF DESCRIPTION OF THE DRAWING

FIG. 1 shows a schematic side view of washing installation of a preferred embodiment.

DESCRIPTION OF THE PREFERRED EMBODIMENT

Below, a washing installation according to the invention will be described in more detail with reference to the accompanying drawing, which is a schematic side view of a preferred embodiment of a washing installation for potato slices.

The embodiment of a washing installation according to the invention, which is shown in the drawing, has a frame 1, which supports a cutting machine 2 for slicing potatoes, where washing water is supplied directly from the inlet of a first washer 3 to remove starch from the potato slices which are separated after slicing. The potato slices and the washing water are passed, via a funnel and a pipe bend, into a pipe 4, which is caused to rotate by means of a motor 5.

The pipe 4 is arranged to incline slightly downwards from its inlet end to its outlet end and is divided into three portions 6–8. The intermediate portion 7 has a smaller diameter than the two outer portions 6 and 8, which each have a cone-shaped transition at their end facing the intermediate portion 7 and also a corresponding cone-shaped transition or indentation at their end facing away from the intermediate portion 7. In addition, the intermediate portion 7 is perforated, so that the washing water from the first washer 3 to a great extent passes out through the perforations of the intermediate portion 7 to a collecting funnel 9, from which a tube 10 conveys the collected water to a collecting tank 11 and more specifically to a first section 12 of three sections 12–14 in the collecting tank 11.

A second washer 15 ends in the outer portion 8, so that the water which is drawn off in the intermediate portion 7 is replaced by new water with a lower concentration of starch. In both the outer portions 6 and 8, drivers are arranged for stirring the potato slices and further conveyance of the same.

From the open end of the outer portion 8, which end is facing away from the intermediate portion 7, potato slices and water are washed out at one side of a vibrating table 16 with a perforated board 25 for separating water via a collecting funnel 17 and a tube 18 to the second section 13 of the collecting tank 11. The movements of the vibrating table 16 are provided in conventional manner by means of a motor 19.

At the other side of the vibrating table 16, to which side the potato slices are conveyed by the movements of the vibrating table 16, there is a third washer 20, which flushes fresh water from above and from below on the potato slices on the vibrating table 16. This washing water is collected by a funnel 21 and passed through a tube 22 to the third section 14 of the collecting tank 11.

A first pump 23 pumps water from the second section 13 up to the inlet of the first washer 3 adjacent to the cutting machine 2. A second pump 24 pumps water from the third section 14 to the inlet of the second washer 15 in the outer portion 8. Finally, a pump and at least one hydrocyclone (not shown) can be used to separate the water rich in starch in the first section 12 into water which is relatively free from starch and which can be supplied as extra washing water over the potato slices on the vibrating table 16 between the second washer 15 and the third washer 20, and water which is very rich in starch to an outlet of the entire washing installation.

In the collecting tank 11, the first section 12 is connected to the second section 13 for reflux of water from the first section 12 to the second section 13 at a lower water level in the second section 13 than in the first section 12. In the same manner, the second section 13 is connected to the third section 14 for reflux of water from the second section 13 to the third section 14 at a lower water level in the third section 14 than in the second section 13.

Finally, each of the sections 12–14 of the collecting tank 11 can have a filter on its inlet side.

It will be appreciated that several modifications of the above-described embodiment of a washing installation according to the invention are possible within the scope of the invention, such as defined by the appended claims.

What is claimed is:

1. A washing installation, comprising:
   a first washer for washing slices of root vegetable with water,
   a second washer in the form of a rotating pipe supplied with water at an infeed end for the slices of root vegetable washed during slicing, and
   a third washer with a foraminated conveyor for an additional washing of the slices of root vegetable discharged from the pipe and conveyance of the same to a hopper,
   wherein the rotating pipe, on each side of an intermediate portion, has a portion with increased diameter, the intermediate portion is perforrated, and a water inlet is arranged in the portion with increased diameter after the intermediate portion for replacing the washing water flowing out of the perforations of the intermediate portion.

2. A washing installation as claimed in claim 1, wherein the portions with increased diameter each have a cone-shaped transition at their end facing the intermediate portion and each have a corresponding transition at their end facing away from the intermediate portion.

3. A washing installation as claimed in claim 1, further comprising drivers, for moving the slices of root vegetable through the pipe, are arranged in each portion with increased diameter.

4. A washing installation as claimed in claim 1, wherein the foraminated conveyor of the third washer is a vibrating table, at one end of which the slices of root vegetable are discharged from the second washer and at the other end of which the third washer is placed.

5. A washing installation as claimed in claim 1, further comprising a first pump for recirculating water from an outlet of the second washer to an inlet of the first washer, and a second pump for recirculating water from an outlet of the third washer to an inlet of the second washer.

6. A washing installation as claimed in claim 5, further comprising a collecting tank having a first section for the first washer, a second section for the second washer and a third section for the third washer.

7. A washing installation as claimed in claim 6, wherein the inlet of the first pump is connected to the second section, and that the inlet of the second pump is connected to the third section.

8. A washing installation as claimed in claim 6, wherein the first section is connected to the second section for reflux of water from the first section to the second section at a lower water level in the second section than in the first section, and that the second section is connected to the third section for reflux of water from the second section to the third section at a lower water level in the third section than in the second section.

9. A washing installation as claimed in claim 6, wherein each of the sections of the collecting tank has a filter on its inlet side.

10. A washing installation as claimed in claim 2, further comprising drivers, for moving the slices of root vegetable through the pipe, are arranged in each portion with increased diameter.

11. A washing installation as claimed in claim 2, wherein the foraminated conveyor of the third washer is a vibrating table, at one end of which the slices of root vegetable are discharged from the second washer and at the other end of which the third washer is placed.

12. A washing installation as claimed in claim 3, wherein the foraminated conveyor of the third washer is a vibrating table, at one end of which the slices of root vegetable are discharged from the second washer and at the other end of which the third washer is placed.

13. A washing installation as claimed in claim 2, further comprising a first pump for recirculating water from an outlet of the second washer to an inlet of the first washer, and a second pump for recirculating water from an outlet of the third washer to an inlet of the second washer.

14. A washing installation as claimed in claim 3, further comprising a first pump for recirculating water from an outlet of the second washer to an inlet of the first washer, and a second pump for recirculating water from an outlet of the third washer to an inlet of the second washer.

15. A washing installation as claimed in claim 4, further comprising a first pump for recirculating water from an outlet of the second washer to an inlet of the first washer, and a second pump for recirculating water from an outlet of the third washer to an inlet of the second washer.

16. A washing installation as claimed in claim 7, wherein the first section is connected to the second section for reflux of water from the first section to the second section at a lower water level in the second section than in the first section, and that the second section is connected to the third section for reflux of water from the second section to the third section at a lower water level in the third section than in the second section.

17. A washing installation as claimed in claim 7, wherein each of the sections of the collecting tank has a filter on its inlet side.

18. A washing installation as claimed in claim 8, wherein each of the sections of the collecting tank has a filter on its inlet side.

* * * * *